(12) United States Patent
Ramon et al.

(10) Patent No.: US 6,611,211 B2
(45) Date of Patent: Aug. 26, 2003

(54) DATA MASK CODING

(75) Inventors: Dan Ramon, Yokneam Ilit (IL); Gil Walzer, Afula (IL); Etai Adar, Yokneam (IL)

(73) Assignee: International Business Machines Corporation, Armonk, NY (US)

( * ) Notice: Subject to any disclaimer, the term of this patent is extended or adjusted under 35 U.S.C. 154(b) by 49 days.

(21) Appl. No.: 09/849,210

(22) Filed: May 4, 2001

(65) Prior Publication Data

US 2002/0166041 A1 Nov. 7, 2002

(51) Int. Cl.[7] ................................................ H03M 7/00
(52) U.S. Cl. ........................... 341/50; 341/51; 708/209; 382/250
(58) Field of Search ............................. 341/50, 95, 51; 712/224; 708/209; 365/189.01; 382/250

(56) References Cited

U.S. PATENT DOCUMENTS

| 4,085,447 A | * | 4/1978 | Pertl et al. | .................. 712/224 |
|---|---|---|---|---|
| 4,626,824 A | * | 12/1986 | Larson | .................. 341/95 |
| 5,119,331 A | * | 6/1992 | Sussman | ................ 365/189.01 |
| 6,098,087 A | * | 8/2000 | Lemay | ................ 708/209 |
| 6,236,762 B1 | * | 5/2001 | Chui et al. | .................. 382/250 |

* cited by examiner

Primary Examiner—Jean Bruner Jeanglaude
(74) Attorney, Agent, or Firm—Darby & Darby

(57) ABSTRACT

A method for encoding a data mask that consists of a given total number of bits and includes a selected group of contiguous bits within the total number, the selected group having a left end and a right end. The method includes dividing the data mask into a plurality of segments, and representing the segments by respective segment codes, each code indicating whether the bits in the respective segment fall entirely outside the selected group, entirely within the selected group, or include the left end or the right end of the group. The segment codes are combined so as to generate a mask code, which can be decoded to reconstruct the data mask.

19 Claims, 2 Drawing Sheets

DATA MASK CODING

FIELD OF THE INVENTION

The present invention relates generally to data processing devices, and specifically to data masking in such devices.

BACKGROUND OF THE INVENTION

Data masking is used in a wide range of processing applications. Given an input data field made up of a predetermined number of bits, the data mask specifies a group of the bits to be selected by a processor (usually a contiguous group of bits, although not necessarily so). Typically, the mask is held in memory as a data word of the same length as the input data field, with ones in the positions that correspond to the bits that are to be selected, and zeroes elsewhere. By performing a bitwise "AND" operation between the input field and the mask, the processor can extract the contents of the group of bits from the input field that is specified by the mask. Applications of data masking including setting and resetting fields of a memory address of an input/output device; arithmetic operations, such as binary modulus and truncation; and processing of header fields of packets in digital communication devices, such as protocol converters.

When data masking is used, each processor command that is stored in program memory is typically accompanied by a corresponding mask. As the processor reads operation codes (op-codes) from the program memory for execution, it also reads the appropriate mask together with each of the op-codes. The simplest way to store the mask is as an explicit mask word, equal in length to the data fields that are to be processed. This approach becomes very wasteful of bit count when the fields are long. An alternative approach is to pass to the processor only the start and end bits of the selected group of bits that is specified by the mask. This solution, however, requires that the processor implement a complicated formula or state machine in order to reproduce the mask. It is therefore impractical for use in simple, high-speed processors, such as dedicated processors that are used in communication cores and protocol converters. The solution based on passing only start and end bits is also inherently limited to defining contiguous mask fields.

SUMMARY OF THE INVENTION

Preferred embodiments of the present invention provide an improved method and format for encoding data masks. The format has the advantage of being simple to implement and decode, while reducing substantially the number of bits required to represent and store the mask.

In preferred embodiments of the present invention, a data mask is divided into a predetermined number of segments of equal lengths for encoding. Each segment is represented by a unique segment code, depending on its content: Segments that contain only ones (typically segments that are entirely within the group of bits to be selected in accordance with the mask) receive one segment code; segments that contain only zeroes receive a second segment code; and segments containing a transition from zeroes to ones or from ones to zeroes receive third and fourth segment codes, respectively. The third segment code thus identifies the segment that contains the left end of the selected group of bits in the mask, while the fourth segment code identifies the segment containing the right end. Typically, each of the segment codes is two bits long. A coded representation of the entire mask comprises the sequence of segment codes along with the full contents of the segments indicated by the third and fourth codes. A 64-bit data mask, for example, can be divided into eight segments and represented in this way by a 32-bit mask code (eight two-bit segment codes plus the full contents of two eight-bit segments).

To reconstruct the mask, a processor reconstructs the original segments based on the segment codes. On this basis, it concatenates fields of ones or zeroes with the contents of the segments indicated by the third and fourth codes, in the order dictated by the segment codes. No logical operations are required beyond selecting the appropriate fields. This method of encoding and decoding is therefore particularly useful in systems in which it is not desirable to use a microprocessor, such as in communication cores or protocol conversion chips.

There is therefore provide, in accordance with a preferred embodiment of the present invention, a method for encoding a data mask that consists of a given total number of bits and includes a selected group of contiguous bits within the total number, the selected group having a left end and a right end, the method including:

dividing the data mask into a plurality of segments;

representing the segments by respective segment codes, each code indicating whether the bits in the respective segment fall entirely outside the selected group, entirely within the selected group, or include the left end or the right end of the group; and combining the segment codes so as to generate a mask code, which can be decoded to reconstruct the data mask.

Preferably, dividing the data mask into the plurality of segments includes dividing the mask into segments of equal lengths. Most preferably, dividing the mask into the segments of equal lengths includes dividing the mask into segments whose lengths are at least approximately equal to the square root of the total number of bits in the mask. Additionally or alternatively, representing the segments by respective segment codes includes representing each of the segments by a two-bit code.

Further preferably, combining the segment codes includes combining the segment codes with an indication of the bits in the segments that include the left end and the right end of the selected group. Most preferably, combining the segment codes with the indication of the bits includes concatenating the segment codes with the bits in the segments that include the left end and the right end of the selected group.

In a preferred embodiment, the bits in the selected group are ones, while the bits in the data mask that are not in the selected group are zeroes. In another preferred embodiment, the bits in the selected group are zeroes, while the bits in the data mask that are not in the selected group are ones.

Preferably, the method includes storing the mask code in a memory, and conveying the code from the memory to a processor for decoding of the mask code to reconstruct the data mask and application of the reconstructed data mask to process an input field.

There is also provided, in accordance with a preferred embodiment of the present invention, a device for processing an input field of data using a mask that consists of a given total number of bits and includes a selected group of contiguous bits within the total number, the selected group having a left end and a right end, the device including:

a memory, configured to store the mask in an encoded form generated by dividing the mask into a plurality of segments, representing the segments by respective segment codes, each code indicating whether the bits in the respective segment fall entirely outside the selected group, entirely within the selected group, or include the left end or the right end of the group, and combining the segment codes so as to generate a mask code; and a processor, coupled to read the mask code from the memory and operative to decode the mask code so as to reconstruct the mask and to apply the reconstructed mask to process the input field.

Preferably, the processor includes a multiplexer, which is arranged to select the bits to be included in each of the segments of the reconstructed mask, responsive to the segment codes.

In a preferred embodiment, the device is coupled to receive and process data packets in a communication network, and the input field includes a header field of one of the packets.

The present invention will be more fully understood from the following detailed description of the preferred embodiments thereof, taken together with the drawings in which:

DETAILED DESCRIPTION OF PREFERRED EMBODIMENTS

Figure 1:
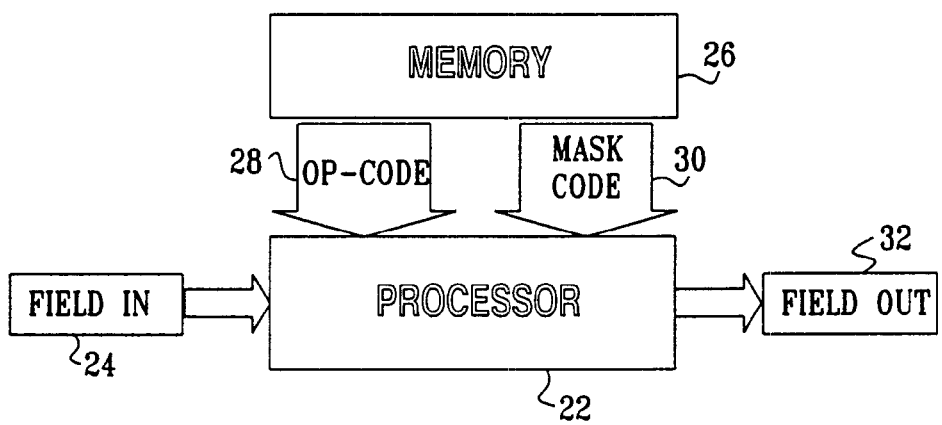
FIG. 1 is a block diagram that schematically illustrates a processing system using data masking, in accordance with a preferred embodiment of the present invention.

FIG. 1 is a block diagram that schematically illustrates a processing system 20 that uses data masking, in accordance with a preferred embodiment of the present invention. System 20 comprises a processor 22, which receives and processes a field of input data 24. In a typical application, system 20 is a communication core or protocol converter, and input data 24 comprise a header of a data packet that is to be processed. Processor 22 processes the input data based on a sequence of instructions read from a memory 26. Each instruction comprises an op-code 28 and an encoded data mask 30. The scheme according to which the mask is encoded and the method by which the processor decodes the mask are described in detail hereinbelow. The processor applies the decoded masks in performing the operations on the input data that are indicated by the op-code, in order to generate a field of output data 32.

Figure 2:
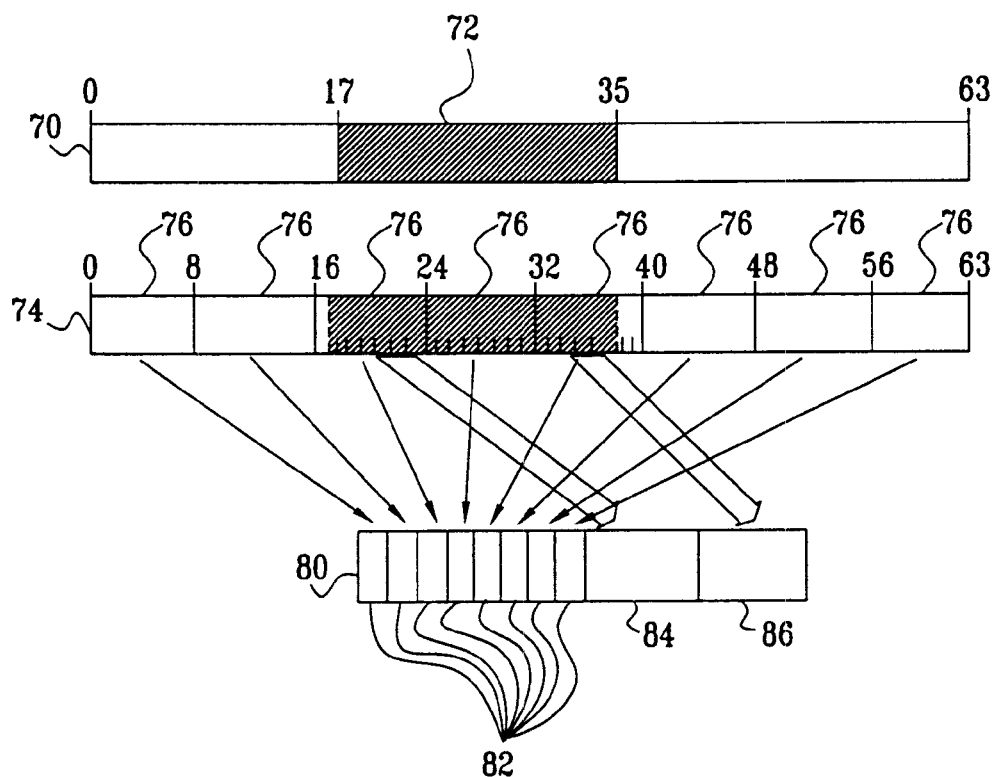
FIG. 2 is a block diagram that schematically illustrates a method for data mask encoding, in accordance with a preferred embodiment of the present invention.

FIG. 2 is a block diagram that schematically illustrates the encoding scheme that is applied in generating the encoded data masks for storage in memory 26, in accordance with a preferred embodiment of the present invention. In the present example, processor 22 is configured to operate on 64-bit fields of input data 24. A mask 70 for use in one of the processing steps is accordingly 64 bits long in total and includes, in this example, a selected group 72 consisting of bits 17 to 35. In other words, bits 17 to 35 are ones, while the remaining bits in mask 70 are zeroes.

An encoding template 74 is defined to consist of eight segments 76, each eight bits long. When template 74 is applied to mask 70, the first two and last three segments contain all zeroes, while the fourth segment contains all ones. The third segment, at the left end of group 72, contains "0111111". The fifth segment, at the right end of group 72, contains "11110000".

In order to encode mask 70, each segment 76 is represented by a two-bit segment code:

"00000000"→"00"

"11111111"→"01"

Left end→"10"

Right end→"11".

A mask code 80 representing mask 70 consists of eight two-bit segment codes 82, preferably arranged in order of their appearance in mask 70. The segment codes are followed by a left-end field 84 and a right-end field 86. Fields 84 and 86 are preferably both eight bits long and contain the full contents of the third and fifth segments 76 of the data mask, as shown in FIG. 2. Thus, mask 70 is represented by the 32-bit mask code "00 00 10 01 11 00 00 00 01111111 11110000".

Any mask containing a single, contiguous selected group of either ones or zeroes can be represented in this manner. For example, the negative of mask 70 (in which all of the zeroes and ones are reversed) is represented by "01 01 10 00 11 01 01 01 10000000 00001111". The principles of mask code 80 may be extended in a straightforward way to encode masks that contain multiple, non-contiguous selected groups.

The use of mask code 80 to represent mask 70 provides, in this case, a savings of 32 bits (50%) in memory storage and in bandwidth required to convey the mask from memory 26 to processor 22. More generally speaking, if mask 70 is divided into m segments of n bits each, the method of FIG. 2 will represent the L=m*n bits of the mask with 2(m+n) bits in mask code 80. The minimum length of code 80 is achieved if m=n=sqrt(L), or if m and n have values approximating the square root of L if L does not have an integer square root. The "cost" savings per bit of the data mask is given by [1−4/sqrt(L)], which also demonstrates that there is no benefit achieved for L≦16. The largest savings are achieved for long data masks.

Various special cases and adaptations of the principles described above will be apparent to those skilled in the art. For example, if the number and size of the segments are chosen so that the left and right ends of the selected group of bits fall exactly on the segment boundaries, then a one-bit code is sufficient to represent each of the segments, and fields 84 and 86 are not needed. On the other hand, in such a case, it is possible that the segment size is too small, and that larger segments would give better compression of the data mask. As a further example, each of the eight-bit fields 84 and 86 may be encoded using only three bits, on the basis of run length of the zeroes or ones. This additional encoding step would compress mask code 80 still further, but would also require additional logic for decoding in processor 22, which may not be desirable.

Figure 3:
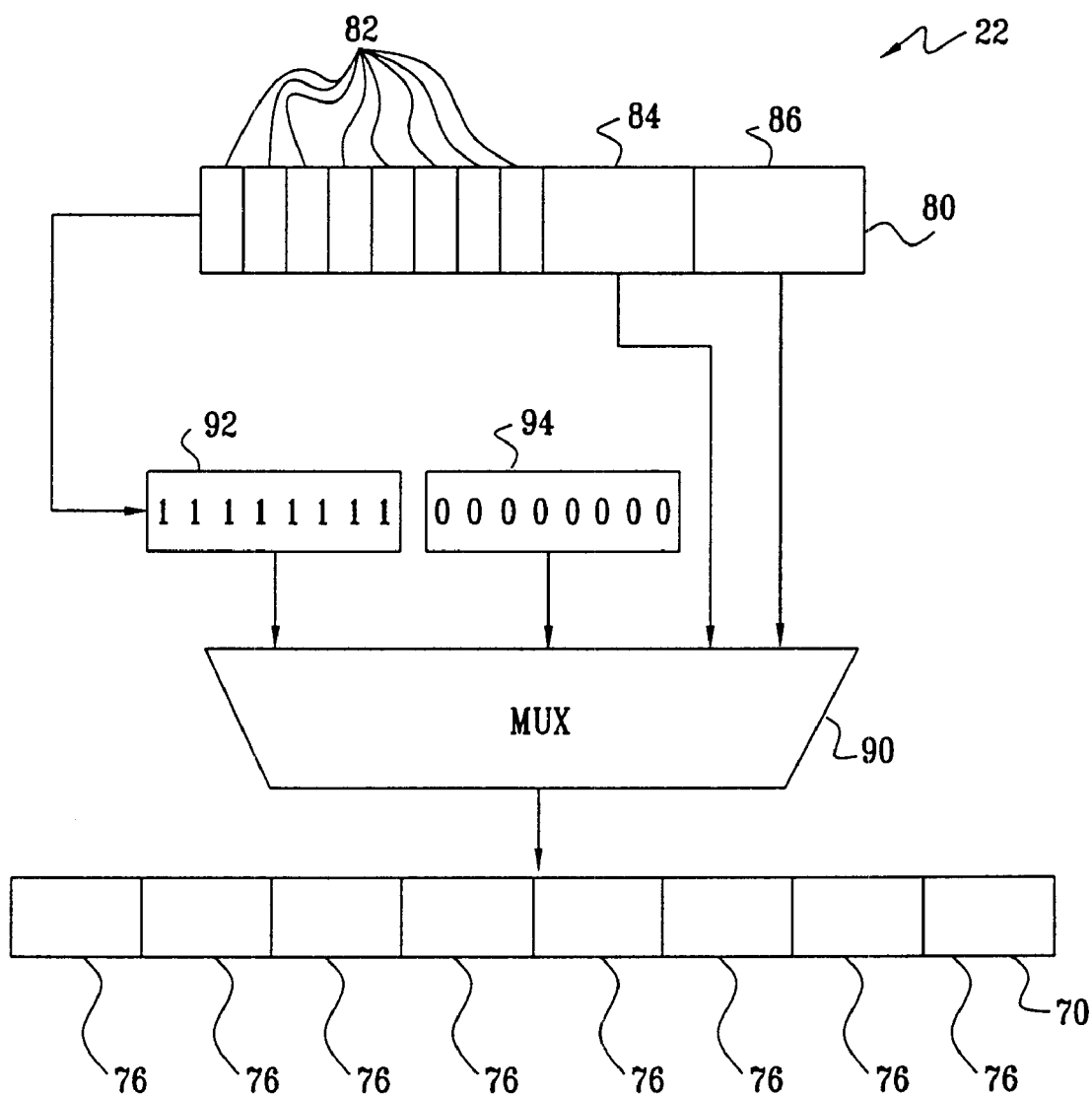
FIG. 3 is a block diagram that schematically illustrates circuitry for decoding of a data mask, in accordance with a preferred embodiment of the present invention.

FIG. 3 is a block diagram that schematically illustrates decoding circuitry in processor 22, used to decode mask code 80, in accordance with a preferred embodiment of the present invention. A multiplexer 90 has four different data inputs: a ones input 92 (11111111), a zeroes input 94 (00000000), left-end field 84 and right-end field 86. Segment codes 82 from mask code 80 are fed in sequence to a control input of the multiplexer. Each of the four different segment codes (00 through 11) invokes the corresponding data input to the multiplexer, and this input is concatenated with the preceding inputs until all eight segment codes have been processed. Thus, in eight cycles of the multiplexer, mask 70 is reconstructed in its entirety. Alternatively, eight multiplexers operating in parallel can reconstruct the entire mask in a single cycle. Other logic circuits for decoding mask codes in accordance with the principles of the present invention will be apparent to those skilled in the art.

It will be appreciated that the preferred embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

What is claimed is:

1. A method for encoding a data mask that consists of a given total number of bits and includes a selected group of contiguous bits within the total number, the selected group having a left end and a right end, the method comprising:

dividing the data mask into a plurality of segments;

representing the segments by respective segment codes, each code indicating whether the bits in the respective segment fall entirely outside the selected group, entirely within the selected group, or include the left end or the right end of the group; and combining the segment codes so as to generate a mask code, which can be decoded to reconstruct the data mask.

2. A method according to claim 1, wherein dividing the data mask into the plurality of segments comprises dividing the mask into segments of equal lengths.

3. A method according to claim 2, wherein dividing the mask into the segments of equal lengths comprises dividing the mask into segments whose lengths are at least approximately equal to the square root of the total number of bits in the mask.

4. A method according to claim 1, wherein representing the segments by respective segment codes comprises representing each of the segments by a two-bit code.

5. A method according to claim 1, wherein combining the segment codes comprises combining the segment codes with an indication of the bits in the segments that include the left end and the right end of the selected group.

6. A method according to claim 5, wherein combining the segment codes with the indication of the bits comprises concatenating the segment codes with the bits in the segments that include the left end and the right end of the selected group.

7. A method according to claim 1, wherein the bits in the selected group are ones, while the bits in the data mask that are not in the selected group are zeroes.

8. A method according to claim 1, wherein the bits in the selected group are zeroes, while the bits in the data mask that are not in the selected group are ones.

9. A method according to claim 1, and comprising storing the mask code in a memory, and conveying the code from the memory to a processor for decoding of the mask code to reconstruct the data mask and application of the reconstructed data mask to process an input field.

10. A device for processing an input field of data using a mask that consists of a given total number of bits and includes a selected group of contiguous bits within the total number, the selected group having a left end and a right end, the device comprising:

a memory, configured to store the mask in an encoded form generated by dividing the mask into a plurality of segments, representing the segments by respective segment codes, each code indicating whether the bits in the respective segment fall entirely outside the selected group, entirely within the selected group, or include the left end or the right end of the group, and combining the segment codes so as to generate a mask code; and a processor, coupled to read the mask code from the memory and operative to decode the mask code so as to reconstruct the mask and to apply the reconstructed mask to process the input field.

11. A device according to claim 10, wherein the plurality of segments are segments of equal lengths.

12. A device according to claim 11, wherein the lengths of the segments are at least approximately equal to the square root of the total number of bits in the mask.

13. A device according to claim 10, wherein the segment codes comprise two-bit codes.

14. A device according to claim 10, wherein the mask code comprises the segment codes together with an indication of the bits in the segments that include the left end and the right end of the selected group.

15. A device according to claim 14, wherein the mask code is generated by concatenating the segment codes with the bits in the segments that include the left end and the right end of the selected group.

16. A device according to claim 10, wherein the bits in the selected group are ones, while the bits in the mask that are not in the selected group are zeroes.

17. A device according to claim 10, wherein the bits in the selected group are zeroes, while the bits in the mask that are not in the selected group are ones.

18. A device according to claim 10, wherein the processor comprises a multiplexer, which is arranged to select the bits to be included in each of the segments of the reconstructed mask, responsive to the segment codes.

19. A device according to claim 10, wherein the device is coupled to receive and process data packets in a communication network, and wherein the input field comprises a header field of one of the packets.

* * * * *